United States Patent [19]

Sugitani et al.

[11] Patent Number: 5,030,812
[45] Date of Patent: Jul. 9, 1991

[54] METHOD FOR ONE-SIDE ROOT PASS WELDING OF A PIPE JOINT

[75] Inventors: Yuji Sugitani; Masatomo Murayama, both of Kawasaki, Japan

[73] Assignee: NKK Corporation, Tokyo, Japan

[21] Appl. No.: 512,742

[22] Filed: Apr. 23, 1990

[30] Foreign Application Priority Data

Jun. 13, 1989 [JP] Japan .................................. 1-148392
Jun. 13, 1989 [JP] Japan .................................. 1-148393

[51] Int. Cl.$^5$ ............................................. B23K 9/022
[52] U.S. Cl. .............................. 219/124.34; 219/61; 219/125.12; 219/130.51
[58] Field of Search .................. 219/124.34, 125.12, 219/60 A, 61, 130.51

[56] References Cited

U.S. PATENT DOCUMENTS 3,922,517 11/1975 Nelson et al. ........................ 219/61
4,851,638 7/1989 Sugitani et al. ................ 219/124.34

FOREIGN PATENT DOCUMENTS 50-22978 8/1975 Japan .............................. 219/125.12
341616 7/1972 U.S.S.R. ......................... 219/60 A

*Primary Examiner*—Clifford C. Shaw
*Attorney, Agent, or Firm*—Frishauf, Holtz, Goodman & Woodward

[57] ABSTRACT

A method for one-side root path welding of a pipe joint comprises the steps of forming a ring groove having a V-shaped bottom portion thereof at end faces of both pipes whose joint is circumferentially welded, attaching a backing material to a butt portion of the pipes from an internal side of the pipes, running an automatic welding machine along a guide rail mounted on an outer surface of the pipes in the circumferential direction thereof, controlling a position of a welding torch along a seam by means of an arc sensor, and welding root pass from the outer side of the pipes with a predetermined welding current and at a welding speed in a high-speed rotating arc welding of the pipes at a predetermined rotational speed and with a predetermined diameter of rotation. The rotational speed of arc is from 10 to 150 Hz. The rotation diameter of the arc is from 1 to 4 mm. The welding current is from 200 to 500 A. The welding speed is from 75 to 300 cm/min.

7 Claims, 4 Drawing Sheets

METHOD FOR ONE-SIDE ROOT PASS WELDING OF A PIPE JOINT

BACKGROUND OF THE INVENTION

1. Field of the Invention

The present invention relates to a method for one-side root pass welding of a pipe joint in a pipe-laying work.

2. Description of the Prior Art

A groove shape in a circumferential butt weld of a pipe joint is generally formed as shown in FIG. 1 (A). The pipe joint is welded as shown in FIG. 1 (B). That is, root pass welding (I), hot pass welding (H), filler pass welding (F) and cap pass welding (C) of the pipe joint are carried out in this order. Firstly, the root pass welding (I) is carried out by the use of an internal welding machine. A welding speed of the root pass welding (I) is about 75 cm/min and weaving of a torch is not carried out. Then, after the root pass welding (I) has been carried out, the hot pass welding (H), filler pass welding (F) and cap pass welding (C) are carried out in this order from an outer surface of pipes with the use of an external welding machine. The welding speed of the hot pass welding (H) is about 100 cm/min and the weaving of the torch is not carried out. The welding speed of the filler pass welding (F) and the cap pass welding (C) is about 30 to 40 cm/min and the pipe joint is welded while the weaving of 6 to 7 mm corresponding to a width of the groove is being carried out.

Since any weaving of a torch is not carried out during welding of the pipe joint by the root pass welding and the hot pass welding in the above-described prior art, a seam tracking control of welding cannot be carried out with the use of arc sensors. Accordingly, time and labour are required to adapt a welding torch of a welder to the center of a groove of the pipe joint. Moreover, defects are liable to occur in a bead of the root and hot pass due to such factors as a propensity of wire to bend and errors of the torch in pointing at positions.

Welding current is limited to about 200 A in the prior art root pass welding. Because a shape of a bead becomes convexed particularly in a position of the torch pointing upward at the time of using electric current higher than 200 A since any wearing of a welding torch cannot be applied. Accordingly, welding of the pipe joint has been regarded as impossible at a higher speed.

An automatic seam tracking control by the use of the arc sensors is carried out as follows:
(a) Make the welding torch weave in the groove in the direction of the groove width.
(b) Detect the deviation of the welding torch by detecting the waveforms of welding current and arc voltage.
(c) Track the welding seam automatically by correcting the torch position on the basis of the information of (b).

Since a vibrating weaving method is adopted in the prior art arc sensors, it is difficult for the weaving frequency to exceed 10 Hz because of mechanical limits such as vibration, backlash or the like. Due to the limitation of the weaving frequency, a welding speed applicable from a viewpoint of responsiveness of the arc sensors and shapes of beads is limited. The automatic seam tracking control cannot be applied at a welding speed of 75 cm/min in the prior art root pass welding.

SUMMARY OF THE INVENTION

It is an object of the present invention to increase a welding speed of a root pass welding and to secure a stability of weld quality during a circumferential butt welding of a pipe joint.

To accomplish the above-mentioned object, the present invention provides a method for one-side root path welding of a pipe joint comprising the steps of:
forming a ring groove having a V-shaped bottom portion thereof at end faces of both pipes whose joint is circumferentially welded;
attaching a backing material to a butt portion of the pipes from an internal side of the pipes;
running an automatic welding machine along a guide rail mounted on an outer surface of the pipes in the circumferential direction thereof;
controlling a position of a welding torch along a seam by means of an arc sensor; and
welding root pass from the outer side of the pipes with a predetermined welding current and at a welding speed in a high-speed rotating arc welding of the pipes at a predetermined rotational speed and with a predetermined diameter of rotation.

The above objects and other objects and advantages of the present invention will become apparent from the detailed description which follows, taken in conjunction with the appended drawings.

BRIEF DESCRIPTION OF THE DRAWINGS

FIG. 1 (B) is a schematic illustration showing a state of a build-up weld of the prior art groove;

FIG. 3 (C) is a schematic illustration showing a state of a build-up weld in case of the groove of the present invention;

DESCRIPTION OF THE PREFERRED EMBODIMENT

Preferred Embodiment-1

In this method, since a rotating weaving of arc is carried out at a high rate of 10 to 150 Hz/sec, an automatic seam tracking with the use of arc sensors can be applied in a high speed welding at 75 to 300 cm/min. Since the automatic seam tracking is carried out, positions of a weld torch are roughly determined in a short time. Defects in a weld are not produced by the deviation of the torch position.

Moreover, since pressure and heat input of arc are dispersed by a high-speed rotation of the arc, a surface shape of bead is made uniform. In consequence, a good shape of bead can be obtained even at the high welding speed of 75 to 300 cm/min.

That is, in the circumferential butt welding of a pipe joint, the rotation frequency of the arc can be easily increased and the arc can be let to track a V-shaped ring groove automatically in a bottom portion which is formed at end faces of the pipes. Accordingly, when the pipe joint is welded under the work of the high-speed rotation arc sensor with the rotating frequency of the arc of 10 to 150 Hz and with the rotating diameter of the arc of 1 to 4 mm while running an automatic welding machine along a circumferential guide rail mounted by a tack weld on the outer surface of the pipes, a circumferential root pass welding of the pipe joint can be carried out in all positions thereof. Moreover, a normal back bead is formed in the root pass welding of the pipe joint by the use of backing material with high welding current of 200 to 500 A and a high welding speed of 75 to 300 cm/min can be realized. Further, the pipe joint can be welded continuously, being followed by the successive filler pass and cap pass weldings, with the root pass welding as a basis.

The rotation frequency of said arc is desired to be 30 to 150 Hz. When the ratation frequency is 30 Hz or more, the effect of a high frequency rotation of the arc appears remarkably. The welding current is desired to be 250 to 500 A. The welding speed is desired to be 150 to 300 cm/min.

Figure 1A:
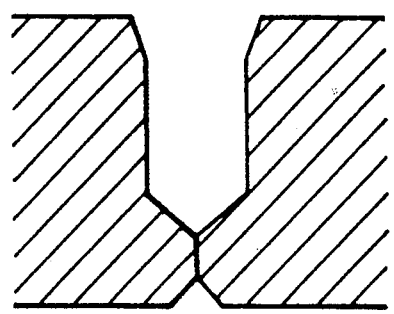
FIG. 1 (A) is an enlarged sectional view of the prior art groove shape.
Figure 1B:
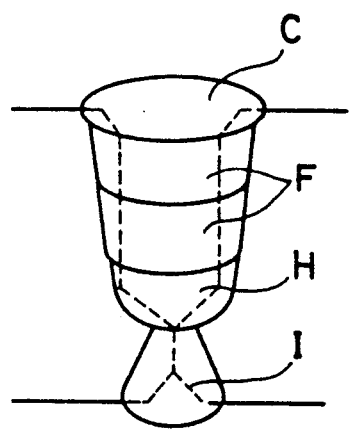
Figure 2:
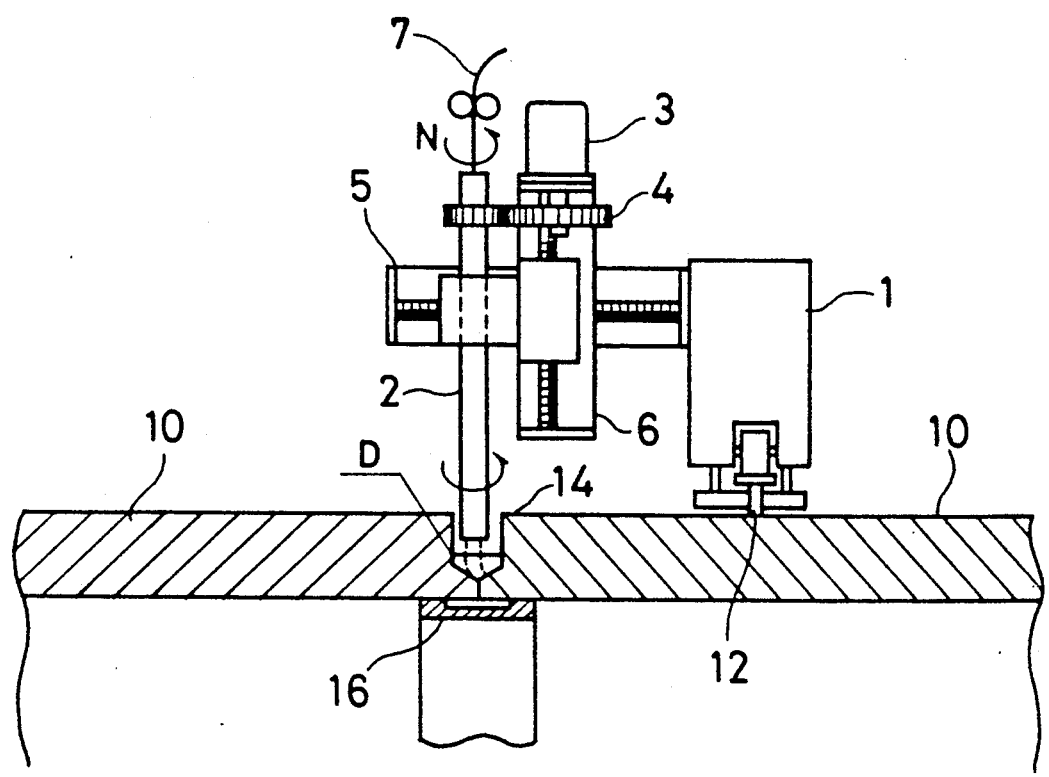
FIG. 2 is a schematic illustration of an automatic welding machine used for a welding method of the present invention.

FIG. 2 is a schematic illustration of an automatic welding machine used for a method of the present invention. Welding machine 1 runs along circumferential guide rail 12 mounted by a tack weld on an outer surface of pipe 10. Welding torch 2 fixed to the welding machine 1 is made to rotate by motor 3 by means of gear mechanism 4. The weld torch 2 is supported by means of x-axis slide block 5 movable in the direction of a width of groove 14 (x-axis) and y-axis slide block 6 movable in the direction of torch height (y-axis). Rotation frequency N of the torch 2 is the rotation frequency of the arc, and a rotating speed and a rotation position of the arc are detected by a rotation frequency detector (not shown). A resistance welding tip is fixed to the torch 2. Welding wire 7 is automatically fed. In this way, the rotating arc welding is carried out at a high speed. Reference numeral 16 denotes a backing material such as copper plate or the like which is attached to a bottom portion of a weld from the reverse side of the weld. The welding wire of 0.8 to 1.6 mm in diameter is used.

Figure 3:
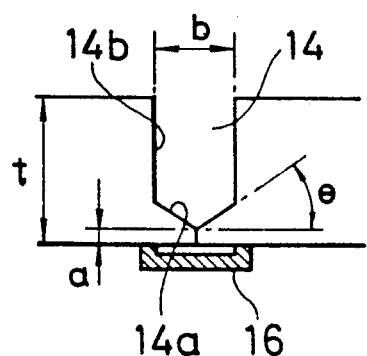
FIG. 3 (A) and (B) are enlarged sectional views of groove shapes of the present invention.
Figure 3:
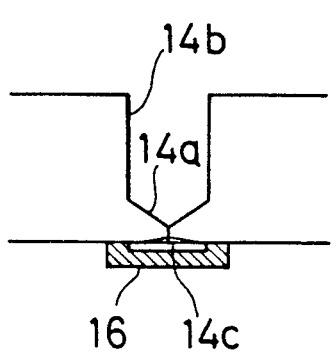
Figure 3:
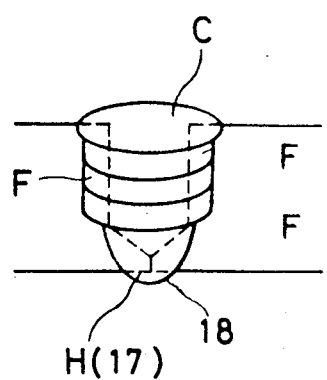

FIGS. 3 (A) and (B) are enlarged sectional views of groove shapes used for executing the method of the present invention. Groove shape 14 is formed so that bottom portion 14a of a groove can be V-shaped and side portion 14b of the groove can be straight. Inclination $\theta$ of the bottom portion 14a is 30° to 60°. Dimension "a" is 1 to 2 mm. Width of groove "b" is 10 mm or less for a pipe with wall thickness "t" of 8 to 25 mm. Small groove 14c as shown in FIG. 3 (B) can be made on the inner side of a pipe having groove 14.

The following are realized by the welding torch 2 shown in FIG. 2 under the work of the rotating arc sensor by forming a V-shaped bottom portion of the groove 14. Firstly, the welding torch can be made to accurately track the center of the bottom portion 14a with a definite length of the arc. Secondly, an outer hot pass welding H following root pass welding 17 can be carried out circumferentially in all positions. Thirdly, back bead 18 can be normally made simultaneously with the root pass welding 17.

The above-mentioned example will be described specifically. The root pass welding 17 was carried out under the following conditions by the use of solid wire of 0.9 mm in diameter and a smooth shape of a bead could be obtained

| Rotation frequency N of arc | 50 Hz |
|---|---|
| Rotation diameter D of arc | 2 to 3 mm |
| Welding current Ia | 300 A |
| Welding speed v | 2.0 m/min |
| Shieling gas | 100% $CO_2$ |

Subsequently, in case filler pass welding F and cap pass welding C are carried out on the root pass 17 in build-up sequence, when the pipe joint is welded under the work of the rotating arc sensors on the basis of the root pass 17, the circumferential butt welding of the pipe joint can be carried out at a high speed. Accordingly, according to the method of the present invention, a period of a pipe-laying work can be reduced to about $\frac{1}{4}$ to $\frac{1}{2}$ compared with that in the prior art method and equipment and the number of laborers can be greatly decreased.

PREFERRED EMBODIMENT-2

Figure 4:
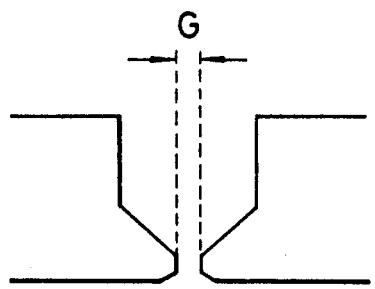
FIG. 4 (A) and (B) are schematic illustrations showing a state of a root gap and a dislocation between both pipe plates.
Figure 4:
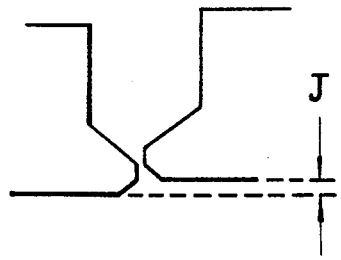

As shown in FIGS. 4 (A) and (B), in a circumferential butt joint of a pipe, occurrence of root gap (G) and dislocation between both pipe plates (J) cannot be avoided in welding at a site. There are required welding procedures which generally allow a root gap of 1.0 mm at its maximum and a dislocation between both pipe plates of 1.6 mm at its maximum. However, welding current and welding speed are limited due to such root gap and dislocation between both pipe plates.

In Preferred Embodiment-2, there is used a control method wherein a peak position of a pulse welding current waveform is synchronized with an optimal position of arc. A pulse and a synchronized position of rotation of the arc are controlled. The synchronized position of the arc is determined by controlling conditions of the pulses such as peak welding current and pulse welding current waveforms.

Figure 5:
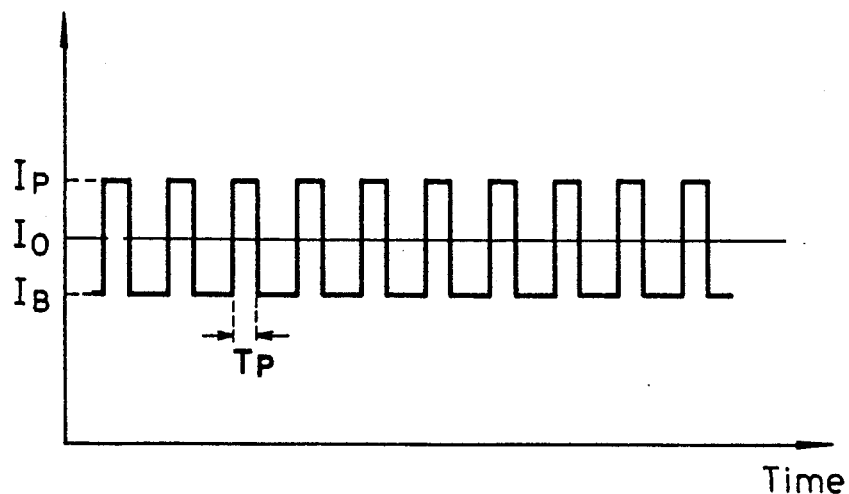
FIG. 5 is a diagram of pulse waveforms of welding current of the present invention.
Figures 6A, 6B:
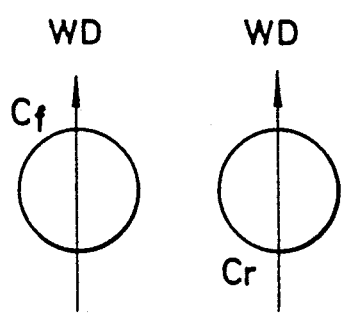
FIGS. 6 (A) to (F) are diagrams showing the relationship between a position of pulse and a position of rotation of arc.
Figures 6C, 6D:
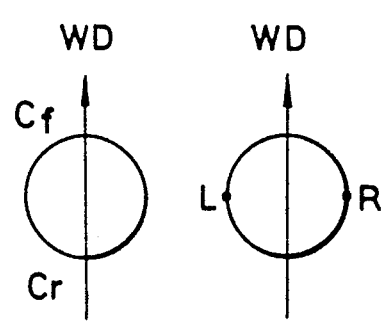
Figures 6E, 6F:
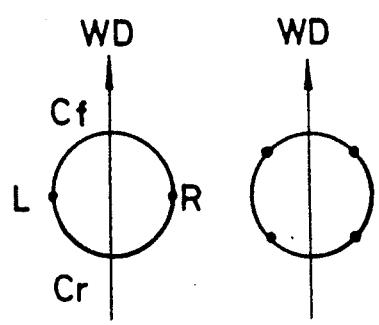

In a pulse arc welding having a pulse welding current waveform as shown in FIG. 5, it is necessary to generate arc symmetrically relative to rotation of arc to exactly carry out a seam tracking control by the use of rotating arc sensors. Methods of determining pulse cycles of peak current $I_P$ comprise methods of one dividing, two dividings and four dividings. FIGS. 6 (A) an (B) show a method of one dividing. FIGS. 6 (C) and (D) show a method of two dividings. FIGS. 6 (E) and (F) show a method of four dividings. Position ($T_P$) of the pulse can be set at any position of the rotation of arc. In the case of the one dividing, for example, the pulse can be generated at a forward position $C_f$ or a rear position $C_r$ in the welding direction WD. In the case of the two dividings, the pulse can be generated at positions $C_f$ and $C_r$ or at positions L and R. In the case of the four dividings, the pulse can be generated at positions $C_f$, $C_r$, L and R or at intermediate positions among those positions.

Values of average welding current $I_a$, peak welding current $I_P$, base welding current $I_B$ and cycle of pulse $t_B$ as shown in FIG. 5 are freely changed dependent on welding conditions. In case a position of pulse is set at position $C_f$ corresponding to one dividing, for example, peak current $I_P$ is elevated by lowering base current $I_B$. A degree of elevating the peak current $I_P$, for example, is determined by detecting arc voltage at position $C_f$. The shapes of back bead are exactly controlled by controlling the pulse in such a manner. A bead shape of a root pass becomes smooth under the effect of the high-speed rotating arc sensors and the high-speed welding with the use of high welding current can be realized. Moreover, since a pipe joint can be continuously welded by successively carrying out a filler pass welding and a cap pass welding on the basis of the root pass welded in this way. Therefore, time for welding can be reduced.

An automatic welding and a groove shape used for Preferred Embodiment-2 are the same as those of FIGS. 2 and 3 shown in Preferred Embodiment-1.

Figure 7:
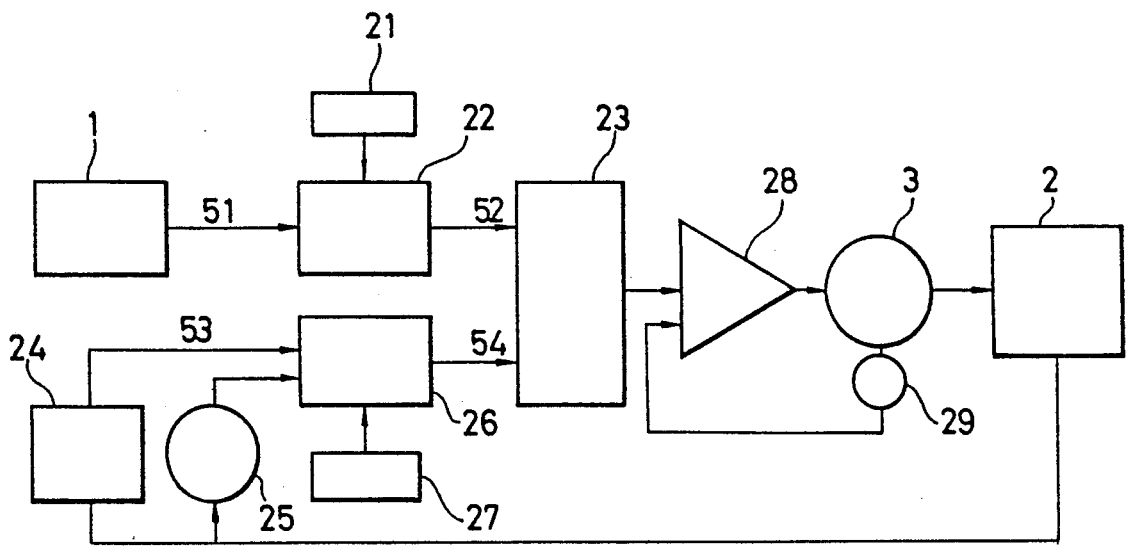
FIG. 7 is a circuit diagram of a pulse synchronizing control used for a controlling method of the present invention.
Figure 8:
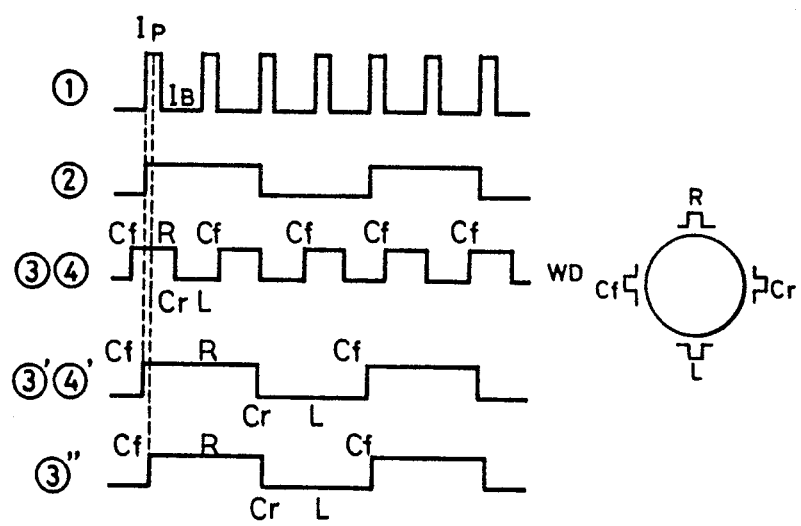
FIG. 8 is a timing chart showing movements of controlled waveforms of FIG. 7.

FIG. 7 shows a circuit diagram of a pulse control used in the present invention. FIG. 8 is a timing chart designating a working principle of a control waveform in a pulse control circuit.

In FIGS. 7 and 8, pulse welding current 51 of the pulse welding power source 1 is, for example, made to be two dividings by divider 22 in accordance with a predetermined dividing instruction. A divided waveform 52 is inputted into a pulse-synchronizing control circuit 23. A rotating position signal 53 and a rotation frequency signal $C_f$ of welding torch 2 are inputted into phase-adjusting device 26 by means of rotating position signal generator 24 and encorder 25. Arc rotating position signal 54 is inputted from the phase-adjusting device 26 into pulse-synchronizing control circuit 23. Welding current pulse 51 is not synchronized with arc rotating pulse 54. To synchronize the welding current pulse with the arc rotating position signal, the pulse welding current is converted to waveforms 53' and 54' obtained by adjusting the phase and the rotation frequency. Subsequently, a position of peak current pulse is made to coincide with position $C_f$ by causing control waveform 53'' to shift by means of a delay circuit.

Rotating driver 28 is controlled by signal 53'' synchronized in this way. Subsequently, rotating motor 3 is driven by a signal from rotating driver 28 and the rotation frequency of the welding torch is controlled. Referential numeral 29 denotes a rotating detector of the motor and the signal of the rotating detector is transferred back to the rotating driver 28.

A specific example will be described below. Solid wire of 0.9 mm in diameter was used. When root pass welding 17 was carried out under the following conditions, back bead 18 of a good shape was obtained. A smooth bead of the root path, of course, was obtained.

| | |
|---|---|
| Rotation frequency N of arc | 50 Hz |
| Rotating diameter D of arc | 2 to 3 mm |
| Average welding current Ia | 300 A |
| Peak current $I_P$ | 420 A |
| Base Current $I_B$ | 180 A |
| Pulse cycle | 10 ms |
| Welding speed v | 2.0 m/min (2 dividings) |
| Shieling gas | 100% $CO_2$ gas |

Since filler pass welding F and cap pass welding C can be continuously carried out in build-up sequence on the basis of the root pass 17, a circumferential butt welding of a pipe joint can be carried out at a high speed of 300 cm/min.

As described above, according to Preferred Embodiment-2, a hot pass welding can be carried out only from an outer surface of pipes by the use of a rotating arc sensor method. Moreover, since the back bead can be normally made simultaneously with the hot pass welding, the circumferential butt welding of a pipe joint can be easily and rapidly carried out in a pipeline-laying work.

What is claimed is:

1. A method for increasing the speed for one side root pass welding of a pipe joint that joins the end faces of two pipes, said pipes respectively having an outer surface and an inner surface, comprising the steps of:

forming a ring shaped groove at said end face of each of said pipes which are to be welded together, said ring shaped groove defining a butt portion on each of said pipes, said butt portions forming a V shape bottom portion when said butt portions of both said pipes are positioned adjacent to each other for welding;

attaching a backing material to said butt portion of said pipes on said inner surface of said pipes;

moving an automatic welding machine along a guide rail mounted on said outer surface of at least one of said pipes in a direction around the circumference of said pipes;

providing arc sensing means for controlling the welding torch of a high speed rotating arc welding means mounted on said automatic welding machine, to move along said V shaped bottom portion;

root pass welding said pipes together from said outer surface of said pipes by means of said high speed rotating arc welding means by supplying a predetermined welding current to said rotating arc welding means and rotating said welding torch in the range of 10 to 150 cycles per second, with a rotational diameter of said arc being in the range of 1 to 4 mm; and supplying welding wire to said ring shaped groove which is in the range of 0.8 mm to 1.6 mm in diameter.

2. The method of claim 1 wherein said welding current is in the range of 200 to 500A; and said torch welds said pipes at a speed in the range of 75 to 300 cm/min.

3. A method for increasing the speed for one side root pass welding of a pipe joint that joins the end faces of two pipes, said pipes respectively having an outer surface and an inner surface, comprising the steps of:

forming a ring shaped groove at said end face of each of said pipes which are to be welded together, said ring shaped groove defining a butt portion on each of said pipes, said butt portions forming a V shape bottom portion when said butt portions of both said pipes are positioned adjacent to each other for welding;

attaching a backing material to said butt portion of said pipes on said inner surface of said pipes;

moving an automatic welding machine along a guide rail mounted on said outer surface of at least one of said pipes in a direction around the circumference of said pipes;

providing arc sensing means for controlling the welding torch of a high speed rotating arc welding means mounted on said automatic welding machine to move along said V shaped bottom portion; and root pass welding said pipes together from said outer surface of said pipes by means of said high speed rotating arc welding means by supplying a pulse welding current in the range of 200-500A to said rotating arc welding means and rotating said arc in the range of 10 to 150 cycles per second with a rotational diameter in the range of 1-4 mm;

supplying welding wire to said ring shaped groove which is in the range of 0.8 mm to 1.6 mm in diameter; and welding said pipe at a welding speed in the range of 75 to 300 cm/min.

4. The method of claim 3 comprising controlling said root pass welding by sychronizing a peak current value of said pulse welding current with any position of the rotation of said rotating arc.

5. The method of claim 4 wherein said peak value of said welding current is synchronized with said any position of said rotation arc by dividing said peak value of said welding current at least once by a predetermined value.

6. The method of claim 5 wherein synchronization is achieved by dividing said peak value of said welding current twice by said predetermined value.

7. The method of claim 5 wherein said synchronization is achieved by dividing said peak value of said welding current four times by said predetermined value.

* * * * *